US012695762B2

(12) United States Patent
Davraev et al.

(10) Patent No.: US 12,695,762 B2
(45) Date of Patent: Jul. 28, 2026

(54) CORRELATING SECURITY ALERTS USING LARGE LANGUAGE MODELS

(71) Applicant: Microsoft Technology Licensing, LLC, Redmond, WA (US)

(72) Inventors: Daniel Davraev, Or Yehuda (IL); Idan Yehoshua Hen, Tel Aviv (IL); Tamer Salman, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 143 days.

(21) Appl. No.: 18/466,616

(22) Filed: Sep. 13, 2023

(65) Prior Publication Data

US 2025/0088517 A1 Mar. 13, 2025

(51) Int. Cl.
*H04L 9/00* (2022.01)
*H04L 9/40* (2022.01)
*H04L 41/16* (2022.01)

(52) U.S. Cl.
CPC .......... *H04L 63/1416* (2013.01); *H04L 63/20* (2013.01); *H04L 41/16* (2013.01)

(58) Field of Classification Search
CPC ..... H04L 63/1416; H04L 63/20; H04L 41/16; H04L 63/14; G06N 3/02; G06N 3/04; G06N 3/08; G06N 20/00; G06F 21/55; H04W 12/12
See application file for complete search history.

(56) References Cited

U.S. PATENT DOCUMENTS

2019/0260764 A1* 8/2019 Humphrey .......... H04L 63/1441
2020/0097763 A1* 3/2020 Haerterich ............. G06N 3/094
2023/0208869 A1 6/2023 Bisht

OTHER PUBLICATIONS

Al-Garadi, et al., "A Survey of Machine and Deep Learning Methods for Internet of Things (IoT) Security", IEEE Communications Surveys & Tutorials, vol. 22, No. 3, 2020, pp. 1646-1685.
International Search Report and Written Opinion received for PCT Application No. PCT/US2024/041596, mailed on Oct. 17, 2024, 13 pages.

* cited by examiner

*Primary Examiner* — Syed M Ahsan
(74) *Attorney, Agent, or Firm* — Ray Quinney & Nebeker P.C.; Christopher K. Hallstrom

(57) ABSTRACT

The disclosure focuses on using a context-based insight system to determine security incident reports that include security incident insights and remediation actions based on various combinations of security alerts in cloud computing systems. The context-based insight system uses a security alert generative language model (GLM) to generate security incident reports based on correlated security alerts within a security incident and the attack-type contexts of those security alerts. By using the security alert GLM guided by attack-type contexts to generate security incident reports, the context-based insight system provides understandable text narratives that provide clear and accurate insights into security incidents including remediation actions to address the security incidents as a whole rather than just reporting individual security alerts of the security incident. Further, the context-based insight system dynamically updates the security incident report as additional related security alerts are detected and received.

20 Claims, 9 Drawing Sheets

100

200

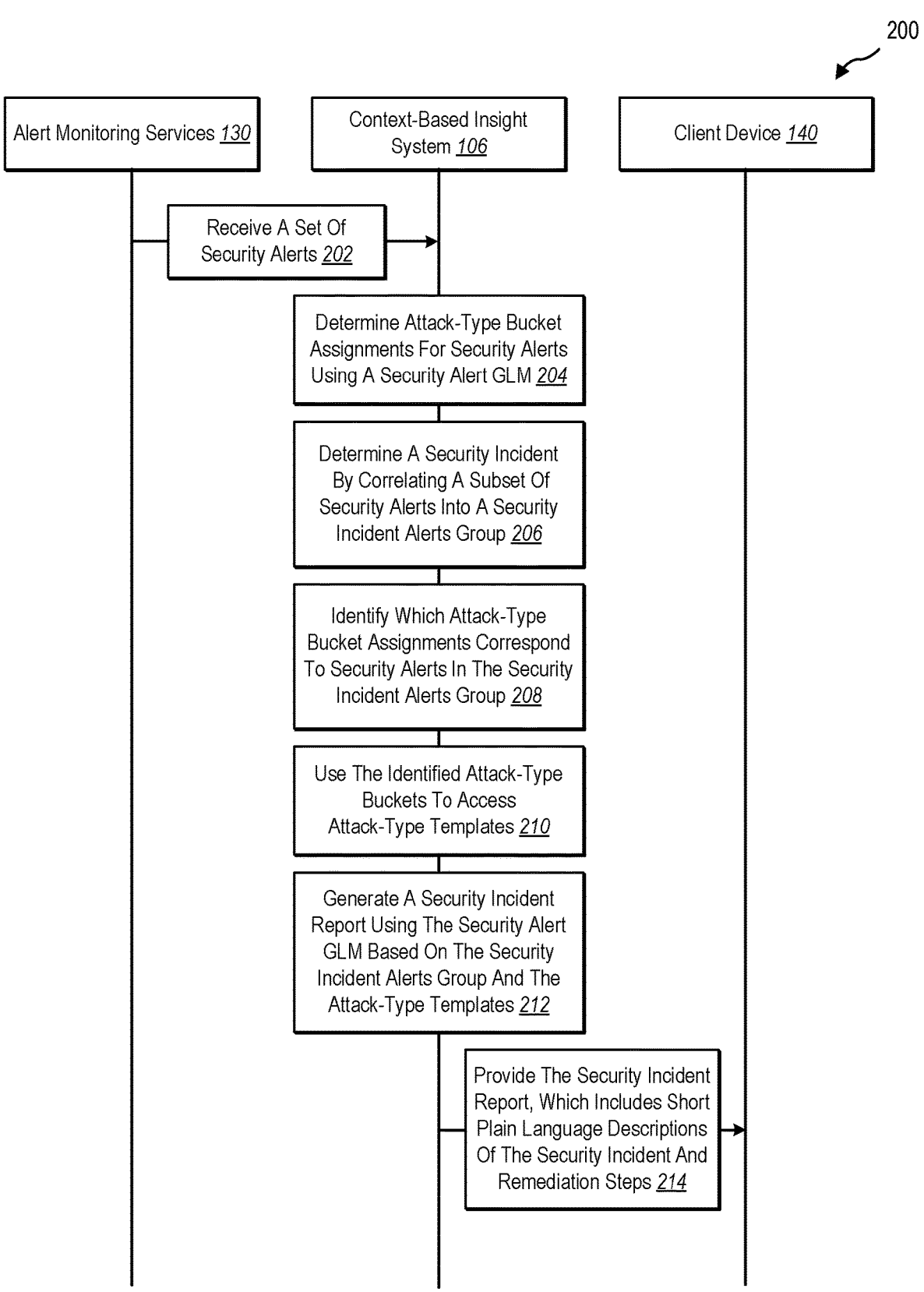

Alert Monitoring Services 130

Context-Based Insight System 106

Client Device 140

Receive A Set Of Security Alerts 202

Determine Attack-Type Bucket Assignments For Security Alerts Using A Security Alert GLM 204

Determine A Security Incident By Correlating A Subset Of Security Alerts Into A Security Incident Alerts Group 206

Identify Which Attack-Type Bucket Assignments Correspond To Security Alerts In The Security Incident Alerts Group 208

Use The Identified Attack-Type Buckets To Access Attack-Type Templates 210

Generate A Security Incident Report Using The Security Alert GLM Based On The Security Incident Alerts Group And The Attack-Type Templates 212

Provide The Security Incident Report, Which Includes Short Plain Language Descriptions Of The Security Incident And Remediation Steps 214

FIG. 2

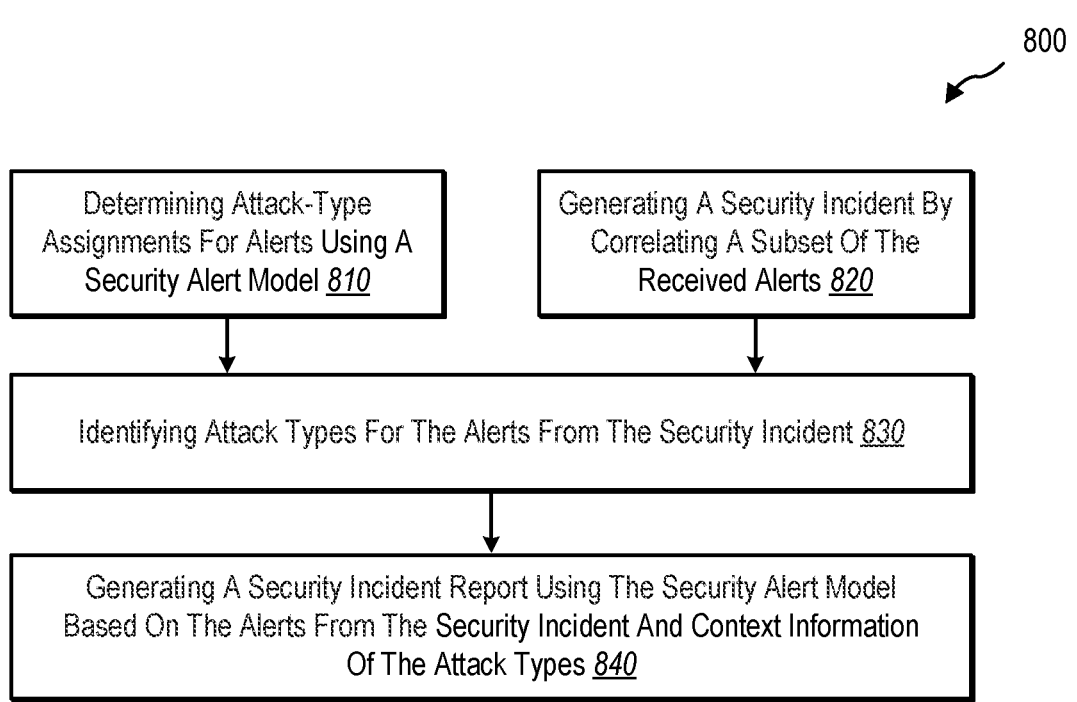

Determining Attack-Type Assignments For Alerts Using A Security Alert Model *810*

Generating A Security Incident By Correlating A Subset Of The Received Alerts *820*

Identifying Attack Types For The Alerts From The Security Incident *830*

Generating A Security Incident Report Using The Security Alert Model Based On The Alerts From The Security Incident And Context Information Of The Attack Types *840*

CORRELATING SECURITY ALERTS USING LARGE LANGUAGE MODELS

BACKGROUND

In recent years, there has been significant progress in both hardware and software within computing devices, with a particularly notable focus on advancements in cloud computing systems. Cloud computing systems offer a wide spectrum of services and applications to users. However, occasional service incidents and outages can disrupt network systems and user experiences. Addressing the reasons behind these incidents has become a priority for system administrators. Regrettably, current systems offer suboptimal insights regarding service incidents when security alerts and metric anomalies occur. To elaborate, numerous existing systems rely on rigid methodologies that tend to become obsolete and struggle to accommodate the ever-changing combinations of security alerts that make up security incidents. Additionally, many existing systems provide users with security incident reports that are lengthy, bulky, and generic. Consequently, existing systems encounter challenges of inefficiency, inaccuracy, and inflexibility when attempting to analyze and provide security incident reports, insights, and remediation measures for service incidents within cloud computing systems.

BRIEF DESCRIPTION OF THE DRAWINGS

The following detailed description provides specific and detailed implementations accompanied by drawings. Additionally, each of the figures listed below corresponds to one or more implementations discussed in this disclosure.

FIG. 2 illustrates an example sequence flow diagram of generating a security incident report with context-based insights based on security attack types using a security alert generative language model.

FIG. 8 illustrates an example series of acts of a computer-implemented method for generating security incident reports with context-based insights in a cloud computing system.

DETAILED DESCRIPTION

Figure 1:
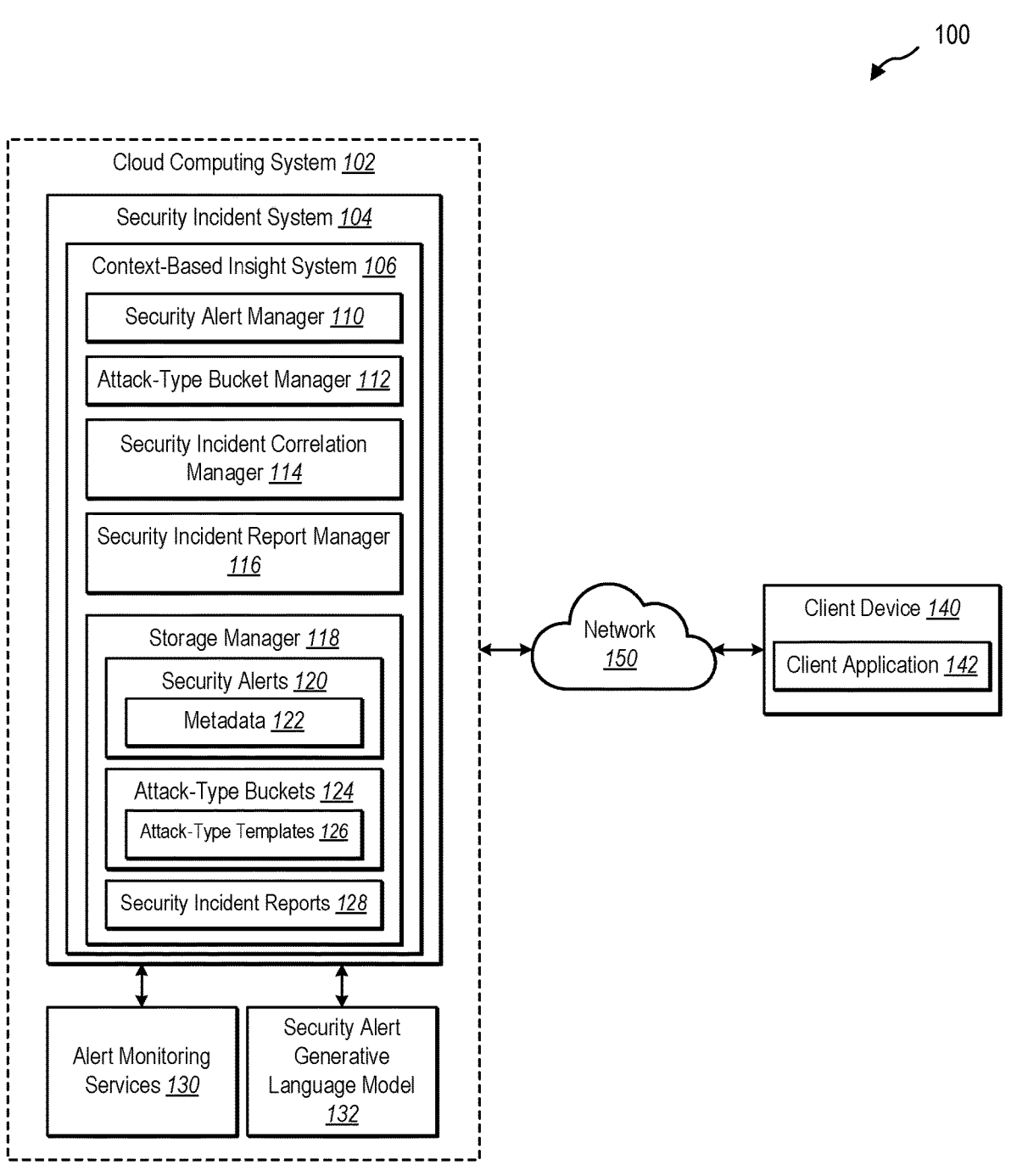
FIG. 1 illustrates an example computing environment where a context-based insight system is implemented in a cloud computing system.

This disclosure describes utilizing a context-based insight system to accurately, flexibly, and efficiently determine security incident reports that include security incident insights and remediation actions based on various combinations of security alerts in cloud computing systems. The context-based insight system uses a security alert generative language model (GLM) to generate security incident reports based on correlated security alerts in a security incident and attack-type contexts of those security alerts. By using the security alert GLM guided by attack type contexts to generate security incident reports, the context-based insight system provides understandable text narratives that provide clear and accurate insights into security incidents including remediation actions to address the security incidents as a whole rather than just reporting individual security alerts of the security incident. Indeed, the context-based insight system provides a contextual understanding of why security alerts in a security incident are correlated, the security scenario they present, and timely remediation actions. Further, the context-based insight system dynamically updates the security incident report as additional related security alerts are detected and received.

To illustrate, in various implementations, the context-based insight system determines a security incident from a set of received and correlated security alerts. Additionally, the context-based insight system determines attack types for the correlated security alerts within the security incidents by assigning the security alerts to attack-type buckets. The context-based insight system then uses a generative language model (GLM), such as a large language model (LLM), to generate security incident reports based on correlated security alerts and context information gathered from the corresponding attack types. The security incident report provides a plain language description of the security incident, including a brief text narrative of the security incident and remediation actions for the security incident.

For context, a cloud computing system, including a multi-cloud system, provides a number of services and applications to users. Periodically, the security of these services and applications is tested and challenged. Often, monitoring services within the cloud computing system and/or at the source of an occurrence detect and generate a security alert, which is provided to a security incident system. Often, a security incident system correlates related security alerts, determines security incidents, and reports security incidents to the appropriate parties.

Currently, security incident reports are generic and lack sufficient information and intelligence to do more than inform users of a security incident. In contrast, the context-based insight system disclosed herein uses approaches and techniques to provide contextually relevant security incident reports that specifically explain the security alerts triggered in a security incident and suggest remediation actions to take. Further, the context-based insight system provides brief, concise, plain-language text narratives to minimize user confusion.

As described in this disclosure, including the following paragraphs, the context-based insight system delivers several significant technical benefits in terms of computing accuracy, flexibility, and efficiency compared to existing systems. Moreover, the context-based insight system provides several practical applications that address problems related to identifying the underlying threats of security incidents and reporting the context of a security attack with corresponding remediation actions clearly and concisely.

To illustrate, the context-based insight system implements a multi-step framework within a cloud computing system that leverages a security alert generative language model at multiple steps to efficiently, accurately, and flexibly determine and generate accurate context-based insights provided within a security incident report for a security incident.

By using the security alert generative language model, the context-based insight system provides accurate and efficient text narrative responses for a wide combination of security alerts. For instance, the security alert generative language model is trained on a vast dataset and can produce fluent, coherent, and topic-specific responses. Further, the security alert generative language model has applications in natural language understanding, content generation, text summarization, dialog systems, language translation, creative writing assistance, and image generation. Unlike existing systems that produce generic, non-useful reports for a security incident, the security alert generative language model can efficiently process, analyze, and correlate different inputs (e.g., security alerts from a security incident and context information of corresponding attack types) and generate accurate text narrative responses for the security incident that briefly report on the cause of the security incident and suggest remediation actions.

As mentioned above, in various implementations, the context-based insight system uses the same security alert generative language model multiple times to perform different tasks (e.g., handling different types of inputs and generating various output types). For instance, in many instances, the context-based insight system uses the security alert generative language model to determine to which attack-type buckets incoming security alerts belong, including generating new attack-type buckets when needed. Additionally, the context-based insight system uses the security alert generative language model to generate security incident reports for a security incident.

Moreover, by using the security alert generative language model, the context-based insight system allows for greater computing flexibility. For example, the broad scope of the security alert generative language model provides flexibility in processing any combination of security alerts. Existing systems are commonly limited to generic reports that are unhelpful beyond reporting a security incident. Sometimes, an existing system identifies a predefined combination of security alerts for that particular security scenario and is able to provide a curated report on this very specific security incident. These detailed reports require extensive manual processing and are impractical due to the large number of ever-growing security alert combinations. In contrast, the security alert generative language model flexibly scales to determine the cause of a security incident for most combinations of security alerts, even combinations having new security alert types.

Utilizing the same security alert generative language model for multiple different tasks provides computing efficiency gains when there are overlapping commonalities between the different tasks (e.g., repeated processing of security alerts and attack-type contexts). Additionally, having a single model rather than multiple models can leverage the same hardware resources to execute the model and requires less storage (e.g., storing a single model rather than multiple models).

In one or more implementations, the context-based insight system provides context information of attack types within an attack-type template. For example, each attack-type bucket to which a security alert is assigned corresponds to an attack-type template. Attack-type templates provide the context of a security attack to the security alert generative language model to be used when generating the security incident report. Additionally, the descriptions of an attack type in an attack-type template enforce consistency both within an attack type and across different attack types.

As illustrated in the foregoing discussion, this disclosure uses a variety of terms to describe the features and advantages of one or more implementations described. To illustrate, this disclosure describes a context-based insight system in the context of a cloud computing system. As an example, the term "cloud computing system" refers to a network of interconnected computing devices that provide various services and applications to computing devices (e.g., server devices and client devices) inside or outside of the cloud computing system. In some instances, the cloud computing system is a security-based system such as MICROSOFT DEFENDER for Cloud. The description of cloud computing systems also includes multi-cloud systems.

In this disclosure, the term "security incident" (or "incident") refers to a specific event or series of events that compromise the confidentiality, integrity, or availability of computer systems, data, or networks, potentially causing harm. Many security incidents require investigation and remediation. Often, a security incident is determined by security alerts triggered by monitoring services and/or client devices within a cloud computing system.

The term "security alert" refers to a notification that signals a potential security issue or breach. Security alerts often serve as early warnings, typically triggered by suspicious or anomalous activities. A security alert includes data (e.g., alert information and/or metadata) such as an alert name, alert type, alert description, entity identifiers (resource identifiers, user identifiers, service identifiers), Internet protocol (IP) addresses, affected processes and resources, timestamps, log information, severity level, adversarial tactics, and/or other data.

As an example, a "generative language model" (GLM) is a large artificial intelligence system that uses deep learning to produce coherent and contextually relevant text based on patterns learned from large amounts of training data. In various implementations, a GLM generative language model is a multi-modal generative model. In many instances, a generative model refers to an advanced computational system that uses natural language processing, machine learning, and/or image processing to generate coherent and contextually relevant human-like responses. Generative language models include Large Language Models (LLMs), which are based on transformer architectures for understanding, generating, and manipulating human language. Examples of LLMs include generative pre-trained transformer (GPT) models like GPT-3.5 and GPT-4, bidirectional encoder representations from transformers (BERT) models, text-to-text transfer transformer models such as T5, conditional transformer language (CTRL) models, and Turing-NLG. Other types of generative language models include sequence-to-sequence models (Seq2Seq), vanilla recurrent neural networks (RNNs), and long short-term memory (LSTM) networks.

Generative language models are trained on vast datasets and can produce fluent, coherent, and topic-specific text and images. Generative language models have applications in natural language understanding, content generation, text summarization, dialog systems, language translation, creative writing assistance, and image generation. A single generative language model performs a wide range of tasks based on receiving different inputs, such as prompts (e.g., input instructions, rules, example inputs, example outputs, and/or tasks), data, and/or access to data. In response, the generative language model generates various output formats ranging from one-word answers to long narratives, images and videos, labeled datasets, documents, tables, and presentations.

This disclosure includes a "security alert generative language model." In various implementations, the security alert generative language model is a type of GLM that is fine-tuned based on security alerts and security incidents. For example, the security alert generative language model is fine-tuned with security-based literature or other security incident documentation. In some implementations, the security alert generative language model is an LLM tuned to particularly process security-related queries.

Further terms are defined throughout the disclosure in various examples and contexts.

Turning now to the figures, additional example implementations and details of the context-based insight system are discussed in connection with the accompanying figures. To illustrate, FIG. 1 shows an example of a computing environment 100 where the context-based insight system is implemented. The computing environment 100 includes various computing devices associated with a context-based insight system 106. The computing environment 100 may include additional devices and components not shown. Additionally, while FIG. 1 shows example arrangements and configurations of a context-based insight system and associated components, other arrangements and configurations are possible.

As shown, the computing environment 100 includes a cloud computing system 102 and a client device 140 connected via a network 150. The cloud computing system 102 includes a security incident system 104, alert monitoring services 130, and a security alert generative language model 132. Each of these systems and/or components may be implemented on one or more computing devices, such as on one or more server devices. Further details regarding these and other computing devices are provided below in connection with FIG. 9, along with additional details regarding networks, such as the network 150 shown.

In one or more implementations, the security incident system 104 manages security alerts and security incidents within one or more computing devices. Additionally, in various instances, the security incident system 104 provides interfaces, tools, services, and frameworks to detect, process, investigate, and remediate security incidents.

In various implementations, the security incident system 104 communicates with the alert monitoring services 130 to detect and report security alerts. For example, the alert monitoring services 130 include agents and/or services throughout the cloud computing system 102 and/or on client devices with access to the cloud computing system 102. These agents and/or services detect security anomalies and potential breaches, generate security alerts, and provide the security alerts to the security incident system 104. The security incident system 104 may then forward the security alerts to the context-based insight system 106.

As shown, the security incident system 104 implements the context-based insight system 106. In some implementations, the context-based insight system 106 is located on a different computing device than the security incident system 104. In one or more implementations, some or all of the context-based insight system 106 is situated on the client device 140.

As mentioned earlier, the context-based insight system 106 generates security incident reports that provide clear and concise text narratives for security alerts and attack types corresponding to a security incident. Further, the context-based insight system 106 uses the security alert generative language model 132, which may be an LLM or another type of GLM. In various instances, the context-based insight system 106 queries the security alert generative language model 132 on multiple occasions with different queries to generate the security incident reports, which include text narratives of context-based insights and remediation actions for security incidents.

As shown, the context-based insight system 106 includes various components and elements, which are implemented in hardware and/or software. For example, the context-based insight system 106 includes a security alert manager 110, an attack-type bucket manager 112, a security incident correlation manager 114, a security incident report manager 116, and a storage manager 118, encompassing security alerts 120 with metadata 122, attack-type buckets 124 with attack-type templates 126, and security incident reports 128.

As mentioned, the context-based insight system 106 includes the security alert manager 110. In one or more implementations, the security alert manager 110 manages security alerts 120. For example, the security alert manager 110 receives security alerts from the security incident system 104 and/or the alert monitoring services 130. The security alert manager 110 may temporarily store the security alerts 120 or store them in long-term memory (e.g., via the storage manager 118). In various implementations, the security alert manager 110 provides the security alerts 120 to other components of the context-based insight system 106.

As shown, the context-based insight system 106 includes the attack-type bucket manager 112. In various implementations, the attack-type bucket manager 112 uses the security alert generative language model 132 (or another model, algorithm, pre-associations, or categorization processes) to determine attack-type buckets for the security alerts 120. For example, the attack-type bucket manager 112 provides security alerts and queries to the security alert generative language model 132 to determine attack-type assignments associated with the attack-type buckets 124.

As shown, the context-based insight system 106 includes the security incident correlation manager 114. In various implementations, the security incident correlation manager 114 determines security incidents by correlating security alerts 120. For example, the security incident correlation manager 114 compares the attack-type bucket assignments of the security alerts 120 to determine which security alerts to include in a security incident.

In some implementations, the security incident correlation manager 114 (or another component such as the attack-type bucket manager 112) determines correlations between security alerts belonging to a security incident and their corresponding attack types. For example, the security incident correlation manager 114 identifies each of the attack types that are determined for correlated security alerts making up a security incident.

As shown, the context-based insight system 106 includes the security incident report manager 116. In various implementations, the security incident report manager 116 uses the security alert generative language model 132 to generate security incident reports 128. For instance, the security incident report manager 116 provides correlated security alerts in a security incident and the attack-type templates 126 of their corresponding attack types to the security alert generative language model 132, along with a query to generate a security incident report based on the instructions and context provided by the attack-type templates 126.

As shown, the computing environment 100 includes the client device 140 with a client application 142. In various implementations, the client device 140 is associated with a user, such as an administrator. The client application 142 enables a user to interact with the security incident system 104 and/or the context-based insight system 106 to investigate security incidents and receive security incident reports 128.

In some implementations, the client application 142 is a web browser application, a mobile application, or another type of application that accesses internet-based content to retrieve and display digital content. In certain implementations, the client application 142 includes a plugin associated with the security incident system 104 that communicates with the context-based insight system 106 to generate security incident reports 128.

With a foundation of the context-based insight system 106 in place, additional details regarding various functions of the context-based insight system 106 will now be described. To illustrate, FIG. 2 shows an example sequence flow diagram of generating a security incident report with context-based insights based on security attack types using a security alert generative language model. As shown, FIG. 2 also includes a series of acts 200 implemented by the context-based insight system 106 in conjunction with the alert monitoring services 130 and the client device 140, which were introduced earlier in connection with a cloud computing system.

As shown, the series of acts 200 includes an act 202 of the context-based insight system 106 receiving a set of security alerts from the alert monitoring services 130. For example, the alert monitoring services 130 detect various security issues throughout a cloud computing system and generate security alerts to report these incidents. The alert monitoring services 130 use various security products, packages, and/or bundles to monitor different sections of the cloud computing system. These security alerts are then provided to the context-based insight system 106, which may receive several security alerts corresponding to different users, resources, processes, and components of the cloud computing system.

As mentioned above, each security alert may include data about the alert. For example, a security alert includes alert information such as the alert name, alert type, and alert description. Additionally, a security alert may include metadata, such as entity identifiers (resource identifiers, user identifiers, service identifiers), Internet protocol (IP) addresses, affected processes and resources, timestamps, log information, and other data. The context-based insight system 106 may use some or all of this information to determine security incidents and security incident reports.

As shown, the act 204 includes the context-based insight system 106 determining attack-type bucket assignments for security alerts using a security alert generative language model. For instance, as the context-based insight system 106 receives security alerts, the security alert generative language model processes the alerts to determine one or more attack types and assigns the alerts to the corresponding attack-type bucket. In some instances, the security alert generative language model determines whether a security alert should be assigned to a new attack-type bucket. Additional information regarding the security alert generative language model determining attack-type bucket assignments for security alerts is provided below in connection with FIGS. 3A-3B.

As shown, the act 206 includes the context-based insight system 106 determining a security incident by correlating a subset of security alerts into a security incident alerts group. For instance, the context-based insight system 106 uses a security alert correlation engine to determine correlations of data among some of the security alerts. When multiple security alerts are correlated, the context-based insight system 106 generates a security incident where the security alerts form a security incident alerts group. Additional information regarding using a security alert correlation engine to generate security incidents and security incident alerts groups is provided below in connection with FIG. 4.

As shown, the act 208 includes the context-based insight system 106 identifying which attack-type bucket corresponds to security alerts in the security incident alerts group. For instance, the context-based insight system 106 determines which attack types correspond to the security incident by associating the alerts in the security incident alerts group with their attack-type bucket assignments.

With the attack types for the security incident determined, the context-based insight system 106 uses the identified attack-type bucket assignments to access attack-type templates, as shown in the act 210. In various instances, the attack-type templates include context information regarding corresponding attack types, which the context-based insight system 106 can provide to the security alert generative language model as input when generating a security incident report. Additional information regarding identifying attack types and attack-type templates for a security incident and/or security incident alerts group is provided in connection with FIG. 5.

As shown, the act 212 includes the context-based insight system 106 generating a security incident report using the security alert GLM based on the security incident alerts group and the attack-type templates. For instance, the context-based insight system 106 provides the security incident alerts group, the attack-type templates (or access to the attack-type templates), and a prompt to generate a security incident report. In response, the context-based insight system 106 generates a security incident report for the security incident that includes context-based insights based on the security attacks as well as appropriate remediation actions. In particular, the context-based insight system generates a security incident report that includes short, concise, plain language descriptions that provide a contextual understanding of why security alerts in the security incident are correlated, the security scenario they present, and remediation actions. Additional details regarding generating security incident reports with the security alert generative language model are provided in connection with FIG. 6.

As shown, the act 214 includes the context-based insight system 106 providing the security incident report to the client device 140, which includes brief plain language descriptions of the security incident and remediation steps. For instance, the security incident report includes a short plain language text narrative of the security incident in the context of the attack types and a concise plain language text narrative of remedial steps. In some instances, the security incident report includes additional information regarding the security incident. Additional details regarding security incident reports are provided below in connection with FIG. 6.

With an overview of the context-based insight system 106 in place, the following figures provide additional details regarding specific components, functions, features, and actions of the context-based insight system 106. To illustrate, FIGS. 3A-3B show example diagrams of determining attack-type buckets for alerts using a security alert generative language model.

Figure 3A:
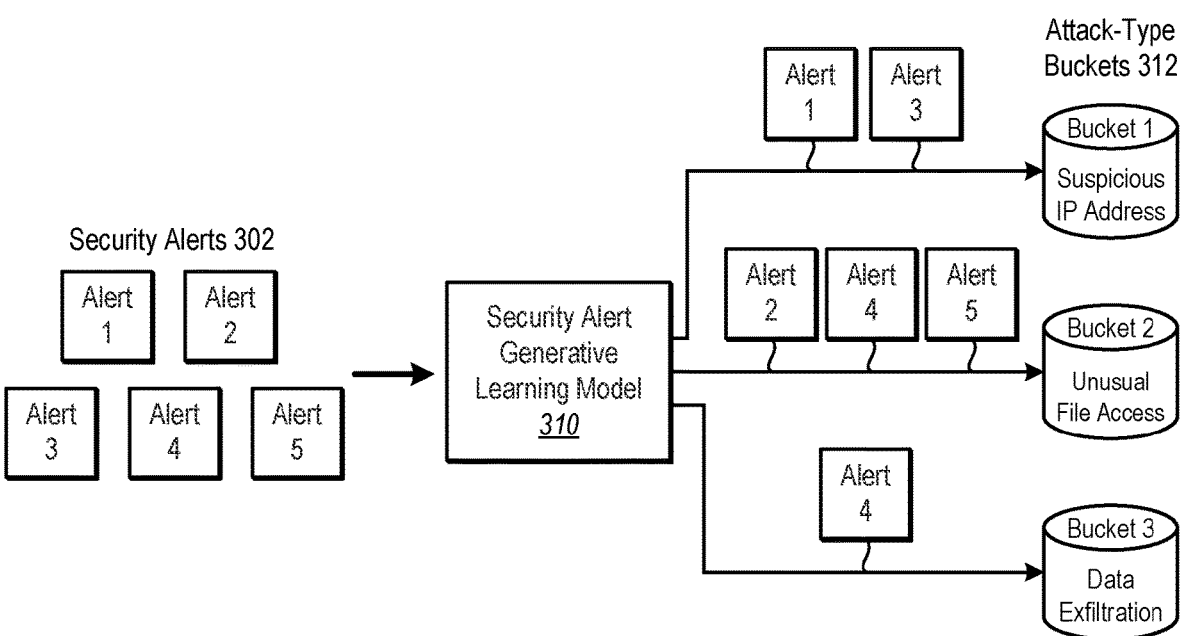
FIGS. 3A-3B illustrate example diagrams of determining attack-type buckets for alerts using a security alert generative language model.
Figure 3B:
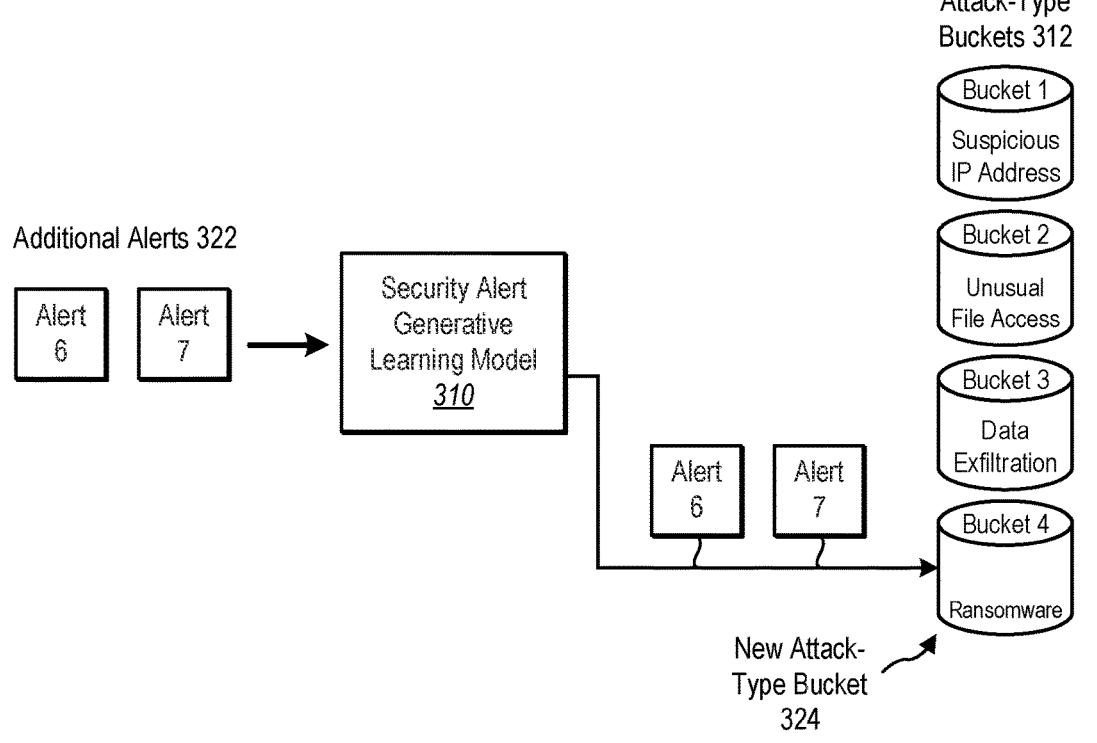

As shown, FIG. 3A includes security alerts 302, a security alert generative language model 310, and attack-type buckets 312. Different implementations may have varying numbers of security alerts and attack-type buckets.

The attack-type buckets 312 correspond to attack-type scenarios. For example, each attack-type bucket represents a specific type of attack scenario. Examples of attack scenarios include suspicious user/entity, data exfiltration, IP entry point/suspicious IP, ransomware, unusual file access, crypto-type attacks, and crypto mining. These attack-type buckets may be thematic bucket categories based on descriptions of the security alerts.

In various instances, the security alert generative language model 310 is a version of the security alert generative language model 132 described above. For example, the security alert generative language model 310 is an LLM that is fine-tuned to process security alerts. The security alert generative language model 310 uses its training across extensive data sets to process the security alerts 302 and determine attack types for each. This way, the security alert generative language model 310 processes the security alerts 302 to discover the intent of the alert and assigns each alert to the appropriate attack-type buckets based on the intent.

In one or more implementations, the context-based insight system 106 uses the security alert generative language model 310 to assign the security alerts 302 to the attack-type buckets 312. In various implementations, the security alert generative language model 310 determines one or more attack-type buckets to which to assign a security alert based on the data within the alerts. As mentioned, security alerts include data, such as names and descriptions of the alerts. Accordingly, the security alert generative language model 310 processes each security alert, determines which attack type the security alert represents, and assigns the security alert to a corresponding attack-type bucket.

In some implementations, the context-based insight system 106 provides a prompt, query, or another input to the security alert generative language model 310 along with one or more security alerts instructing the model to determine an attack type for the alerts. For instance, the context-based insight system 106 provides a first prompt such as "Determine an attack type for the provided security alert."

The security alert generative language model 310 may directly assign the security alert to the corresponding attack-type bucket. In some instances, the security alert generative language model 310 outputs the determination for a security alert, and the context-based insight system 106 assigns the security alert to the corresponding attack-type bucket.

The attack-type buckets 312 may be a data structure, such as one or more databases, tables, or data stores. For instance, each attack-type bucket is a table that lists each security alert belonging to it. In some implementations, the context-based insight system 106 adds an attack-type property to a security alert, indicating its determined attack type.

In FIG. 3A, based on the security alerts 302 being processed by the security alert generative language model 310, Alert 1 and Alert 3 are assigned to the Suspicious IP Address attack-type bucket; Alert 2, Alert 4, and Alert 5 are assigned to the Unusual File Access attack-type bucket; and Alert 4 is assigned to the Data Exfiltration attack-type bucket. As shown, Alert 4 is assigned to two attack-type buckets. For example, the security alert generative language model 310 determined that the name, description, and/or other data of Alert 4 resulted in it being assigned to both the Unusual File Access attack-type bucket and the Data Exfiltration attack-type bucket.

As further described below, each of the attack-type buckets 312 has, or is associated with, an attack-type template. Attack-type templates provide descriptions and context information of attack types. In some implementations, attack-type templates also include prompts and/or instructions when their attack type is part of a security incident, as also described below. In general, the context-based insight system 106 uses attack-type templates to enforce consistency when security incidents involve a corresponding attack type.

In one or more implementations, the security alert generative language model 310 determines that a security alert corresponds to an attack type that does not correspond to an attack-type bucket. In these implementations, the context-based insight system 106 generates a new attack-type bucket via the security alert generative language model 310.

To illustrate, FIG. 3B shows the context-based insight system 106 receiving additional security alerts 322, which are provided to the security alert generative language model 310. In this example, the security alert generative language model 310 determines or discerns that the additional security alerts 322 (e.g., Alert 6 and Alert 7) align with a ransomware attack. Accordingly, the context-based insight system 106 generates the new attack-type bucket 324 named Ransomware (e.g., Bucket 4) to which to assign Alert 6 and Alert 7.

In various implementations, the context-based insight system 106 and/or the security alert generative language model 310 generates the attack-type buckets 312. For example, based on the security alerts that are received, the security alert generative language model 310 determines appropriate attack types. Based on these determinations, the context-based insight system 106 allocates the security alerts to current or new attack-type buckets. Further, the context-based insight system 106 may remove attack-type buckets that have not been assigned for a time period.

Similarly, the context-based insight system 106 uses the security alert generative language model 310 to automatically learn and update attack-type buckets 312. For example, as security alerts change and new alerts are created (which occurs frequently), the profiles of attack-type buckets can change. The context-based insight system 106 automatically updates these attack-type buckets and/or generates new attack-type buckets when the security alerts and the attack types change beyond a threshold amount. By automatically updating, adding, and maintaining attack-type buckets, the context-based insight system 106 ensures up-to-date accuracy of attack types while streamlining maintenance for the attack-type buckets.

In some instances, the security alert generative language model 310 is unable to determine an attack type for a security alert with an acceptable confidence value. In these instances, the context-based insight system 106 may assign the security alert to an unassigned attack-type bucket. In various instances, the context-based insight system 106 may provide the security alert to the security alert generative language model 310 at a later time to determine if, based on other processed security alerts and/or model updating, it can be assigned to an attack-type bucket. In some instances, the context-based insight system 106 drops unassigned security alerts after a period of time.

In one or more implementations, the context-based insight system 106 also generates an attack-type template for an attack-type bucket when the bucket is generated. For example, the context-based insight system 106 prompts the security alert generative language model 310 to generate an attack-type template that provides a description and context information of a particular attack type. The context-based insight system 106 may also add instructions and consistency elements to the attack-type template, which are further described below.

Figure 4:
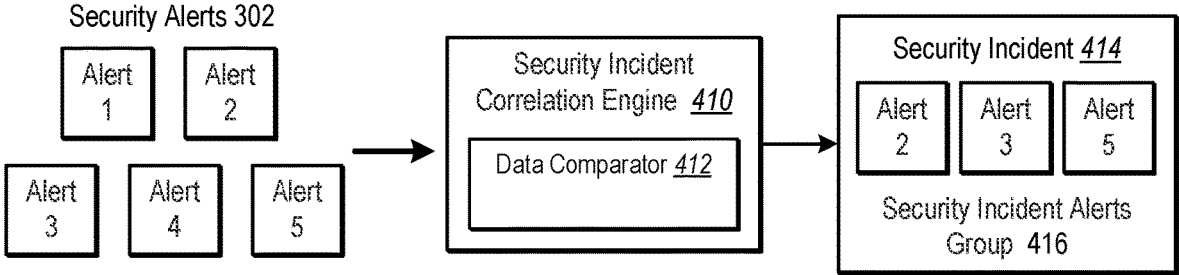
FIG. 4 illustrates an example diagram of determining a security incident using a security incident correlation model.

In addition to assigning incoming security alerts to attack-type buckets, the context-based insight system 106 also correlates the security alerts to determine security incidents. To illustrate, FIG. 4 shows an example diagram of determining a security incident using a security incident correlation model. As shown, FIG. 4 includes the security alerts 302, a security incident correlation engine 410 having a data comparator 412, and a security incident 414 made up of a security incident alerts group 416.

In various instances, the context-based insight system 106 uses the security incident correlation engine 410 to correlate the security alerts 302. Indeed, the context-based insight system 106 determines that a security incident 414 has occurred based on multiple security alerts correlating with each other. Further, when a security incident 414 is generated, the security alerts making up the security incident may be referred to as a security incident alerts group 416.

In various implementations, the context-based insight system 106 determines a security incident based on comparing the data (e.g., metadata) within security alerts. For example, the security incident correlation engine 410 uses a data comparator 412 to compare names, entities, IP addresses, users, resources, identifiers, and/or other attributes of two security alerts to determine if they correlate with one another.

In one or more implementations, the context-based insight system 106 determines a correlation when two or more security alerts have a correlation score meeting a correlation threshold. The security incident correlation engine 410 may determine a correlation score based on the number of matching characteristics and/or the similarity in attribute values. Importantly, the context-based insight system 106 determines the correlations and security incidents independently from determining the attack-type bucket assignments.

In some instances, the data comparator 412 generates and/or uses a large table, such as a relational table or database, that includes the security alerts. Using the relational table, the security incident correlation engine 410 determines a list of alerts that correlate with a given security incident and/or with each other. For example, the security incident correlation engine 410 determines a security incident by correlating a shared entity across multiple security alerts by matching entity identifiers.

Figure 5:
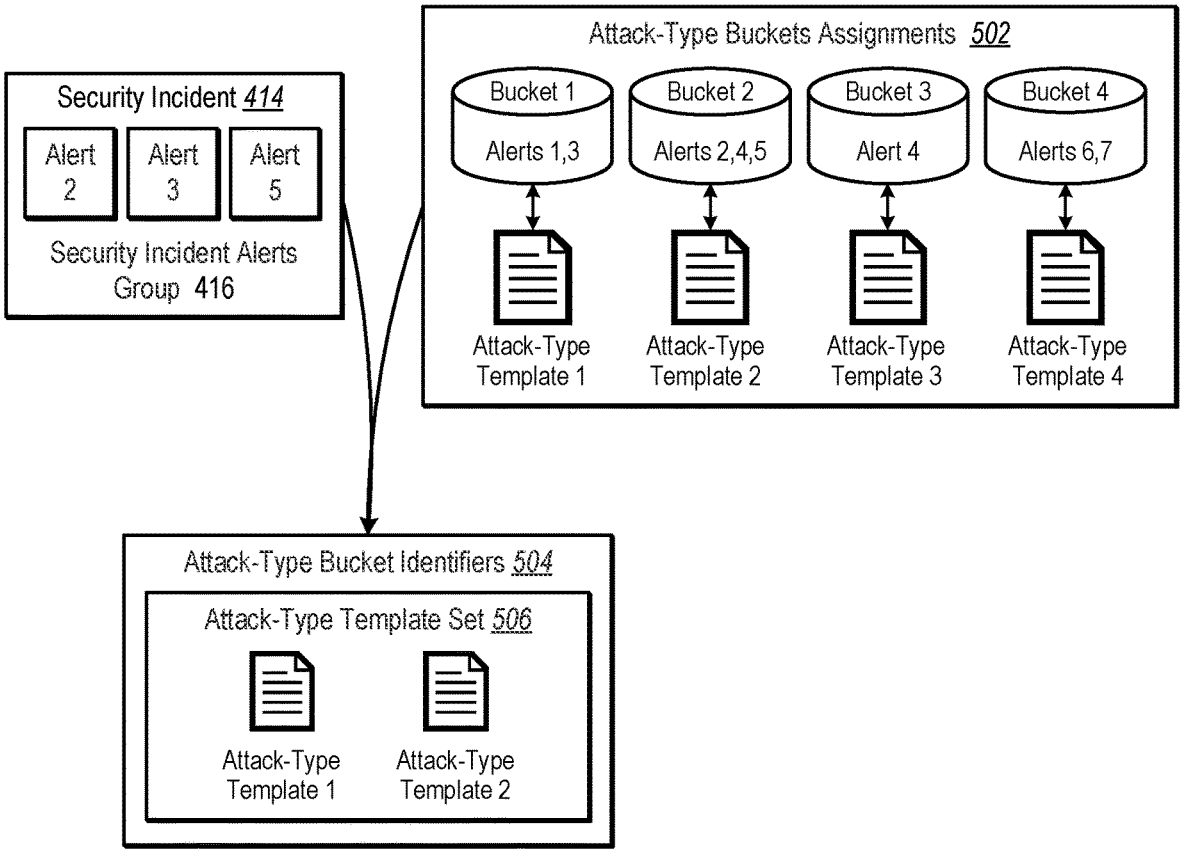
FIG. 5 illustrates an example diagram of determining attack-type bucket identifiers for a security incident.

For each security incident, the context-based insight system 106 may determine which attack types are involved. Accordingly, upon determining attack-type bucket assignments and security incidents/security incident alerts groups, the context-based insight system 106 can determine one or more attack types that correspond to a security incident. To illustrate, FIG. 5 shows an example diagram of determining attack-type bucket identifiers for a security incident. As shown, FIG. 5 includes the security incident 414, attack-type bucket assignments 502, and attack-type bucket identifiers 504.

In various implementations, the context-based insight system 106 determines the attack types belonging to a security incident by identifying the attack types assigned to the security alerts of the security incident. To illustrate, FIG. 5 shows the security incident 414 having the security incident alerts group 416. The security incident alerts group 416 includes the security alerts Alert 2, Alert 3, and Alert 5. Accordingly, to determine the attack types for the security incident 414, the context-based insight system 106 identifies the attack-type bucket assignments for these alerts.

As shown, Alert 2 and Alert 5 are assigned to Attack-Type Bucket 2 (e.g., Unusual File Access), and Alert 3 is assigned to Attack-Type Bucket 1 (e.g., Suspicious IP Address). Accordingly, the context-based insight system 106 can associate these two attack types with the security incident 414 based on the security alerts in the security incident alerts group 416 being assigned to these attack types.

As part of associating an attack type with a security incident, the context-based insight system 106 can access and associate the corresponding attack-type templates with a security incident. As mentioned in this disclosure, attack-type templates provide descriptions, context information, prompts, and/or instructions for the corresponding attack types. Thus, in the provided example, the context-based insight system 106 identifies Attack-Type Template 1 and Attack-Type Template 2 as being linked to the security incident 414. To illustrate, the attack-type bucket identifiers 504 include an attack-type template set 506 that includes these attack-type templates.

By associating a security incident with attack types and/or attack-type templates, the context-based insight system 106 can leverage attack-type descriptions and context information when generating a security incident report. In particular, leveraging attack-type information allows the context-based insight system 106 to generate targeted security incident reports that provide the attack story behind a security incident rather than providing a generic response for one or more security alerts included in a security incident.

Figure 6:
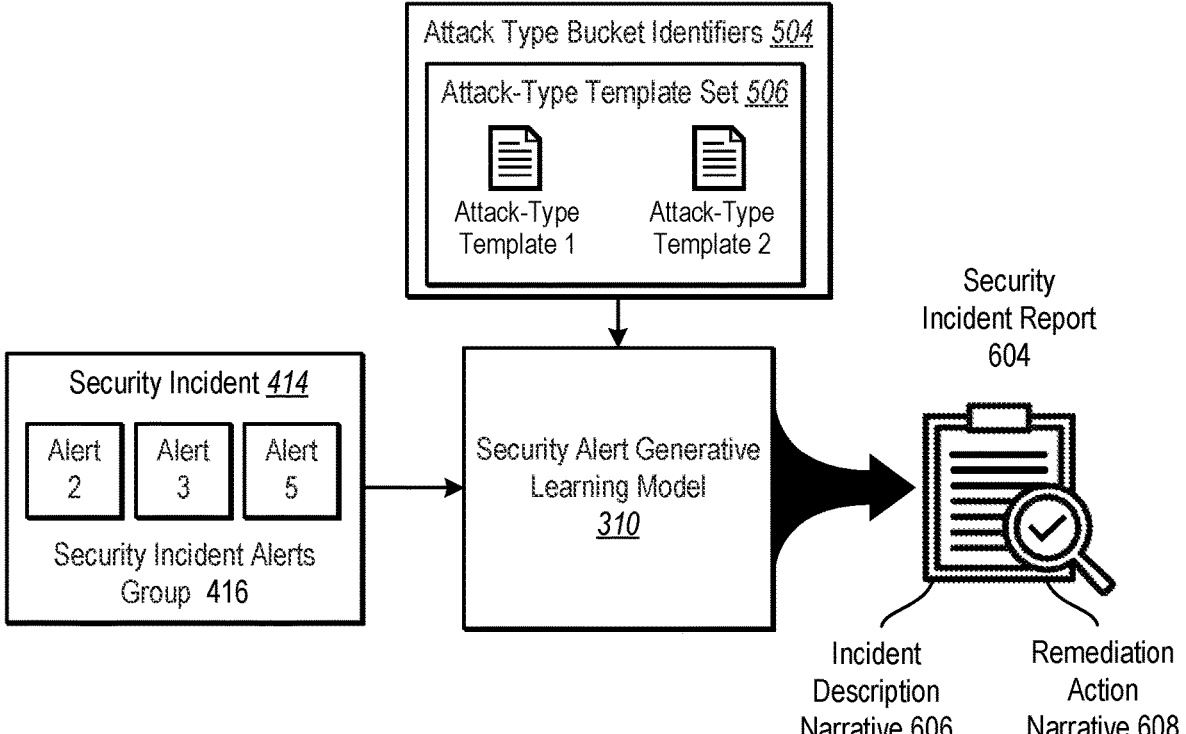
FIG. 6 illustrates an example diagram of generating a security incident report utilizing a security alert generative language model based on attack-type bucket identifiers for the security incident.

To illustrate, FIG. 6 shows an example diagram of generating a security incident report utilizing a security alert generative language model based on attack-type bucket identifiers for the security incident. As shown, FIG. 6 includes the security alert generative language model 310, the security incident 414, the attack-type bucket identifiers 504, and a security incident report 604 having a plain language description of the security incident framed in the context of the relevant attack types.

In many implementations, the security alert generative language model 310 is the same generative language model used to determine attack types, as described above. For example, the context-based insight system 106 uses the same security alert LLM to determine attack-type bucket assignments and generate security incident reports. Because the security alert generative language model 310 is trained and tuned across a wide variety of tasks, it is able to perform both tasks. Further, because the security alert generative language model 310 may be fine-tuned to process security alerts, it may perform both of these security alert-based tasks with increased accuracy compared to other generative language models. In some instances, the context-based insight system 106 uses different models for the two tasks.

As shown, the context-based insight system 106 uses the security alert generative language model 310 to generate the security incident report 604 based on the security incident 414 and the attack-type template set 506. In connection with providing the security incident 414 and/or security incident alerts group 416 to the security alert generative language model 310, the context-based insight system 106 also provides the attack-type bucket identifiers 504 and/or attack-type template set 506.

When providing or supplying the attack-type bucket identifiers 504, the context-based insight system 106 enables the security alert generative language model 310 to access the attack-type template set 506 when not directly provided. For example, the security alert generative language model 310 accesses the attack-type template set 506 from an attack-type template repository. In any case, the context-based insight system 106 directly or indirectly provides the attack-type templates corresponding to the security incident 414 to the security alert generative language model 310.

As shown, the security alert generative language model 310 generates the security incident report 604. For example, the security alert generative language model 310 generates a security incident report that includes brief text narratives regarding the security incident. For example, the security incident report 604 includes an incident description narrative 606 and a remediation action narrative 608. In many implementations, these narratives are brief (e.g., 1-2 sentences) and provide a context-based summary of the security incident and remediation actions or steps. In some instances, the security incident report 604 includes additional brief narratives and/or additional information regarding the security incident.

In various implementations, the security alert generative language model 310 uses the description and data of the correlated security alerts in the security incident alerts group 416 along with context information of the attack types to generate the security incident report 604. For instance, the correlated security alerts in the security incident alerts group 416 provide a first set of information including when alerts were triggered, which entities are involved, and what functions are affected. Then, one or more templates in the attack-type template set 506 provide a second set of information including background and context information for one or more attack types involved in the security incident.

By processing both sets of information, the security alert generative language model 310 is able to determine key fields from each alert to summarize, map alert and attack type information together, and generate a comprehensive account of the security incident as a whole rather than providing a piecemeal report on individual security alerts. Further, the security alert generative language model 310 is able to generate a remediation action narrative 608 that addresses the security incident as a whole rather than a list of piecemeal remediation actions.

Often, by including the attack-type template set 506, the security alert generative language model 310 can report why a security incident occurred along with effective and accurate remediation steps. For example, by incorporating background and context information for attack types of a security incident, the security alert generative language model 310 can more accurately piece together the story of the security incident including why the security alerts in the security incident alerts group 416 are correlated. Stated another way, the attack-type template set 506 allows the security alert generative language model 310 to piece together the attack intent and/or root cause of the security incident.

As mentioned above, in various implementations, the attack-type templates provide prompts, parameters, and/or instructions to the security alert generative language model 310 for generating a security incident report. For example, an attack-type template includes a prompt to generate a security incident report for the security incident 414 given one or more attack types. The attack-type template may also include parameters and/or instructions to generate short, brief, non-verbose plain language narratives in the security incident report 604 (e.g., the incident description narrative 606 and the remediation action narrative 608). Further, an attack-type template may ensure consistency and comprehensive reporting.

Just as an attack-type template may provide output instructions for generating a security incident report with a single attack type, an attack-type template may also provide instructions for generating a security incident report when multiple attack-type templates are provided. For example, an attack-type template for one attack type indicates a hierarchy with other attack-type templates, how to combine or incorporate multiple attack types into a single narrative, and/or how to reduce the text narrative length for each attack type to keep the incident description narrative 606 (e.g., security incident insights) and the remediation action narrative 608 short. In these instances, the attack-type template set 506 ensures that the security incident report 604 is not too verbose or lengthy when multiple attack types are involved in a security incident.

In some instances, the context-based insight system 106 provides the security incident report 604 within an interactive interface. Upon receiving the security incident report 604 at a client device, the context-based insight system 106 allows the client device to request additional information regarding any of the provided narratives. In response, the context-based insight system 106 uses the security alert generative language model 310 to provide longer and/or more detailed responses, explanations, and/or guidance for understanding or correcting the security incident. For example, the security alert generative language model 310 may provide a detailed timeline of how the security incident unfolded or step-by-step instructions for executing a remediation step (or confirmation for automatically executing a remediation action).

Figure 7:
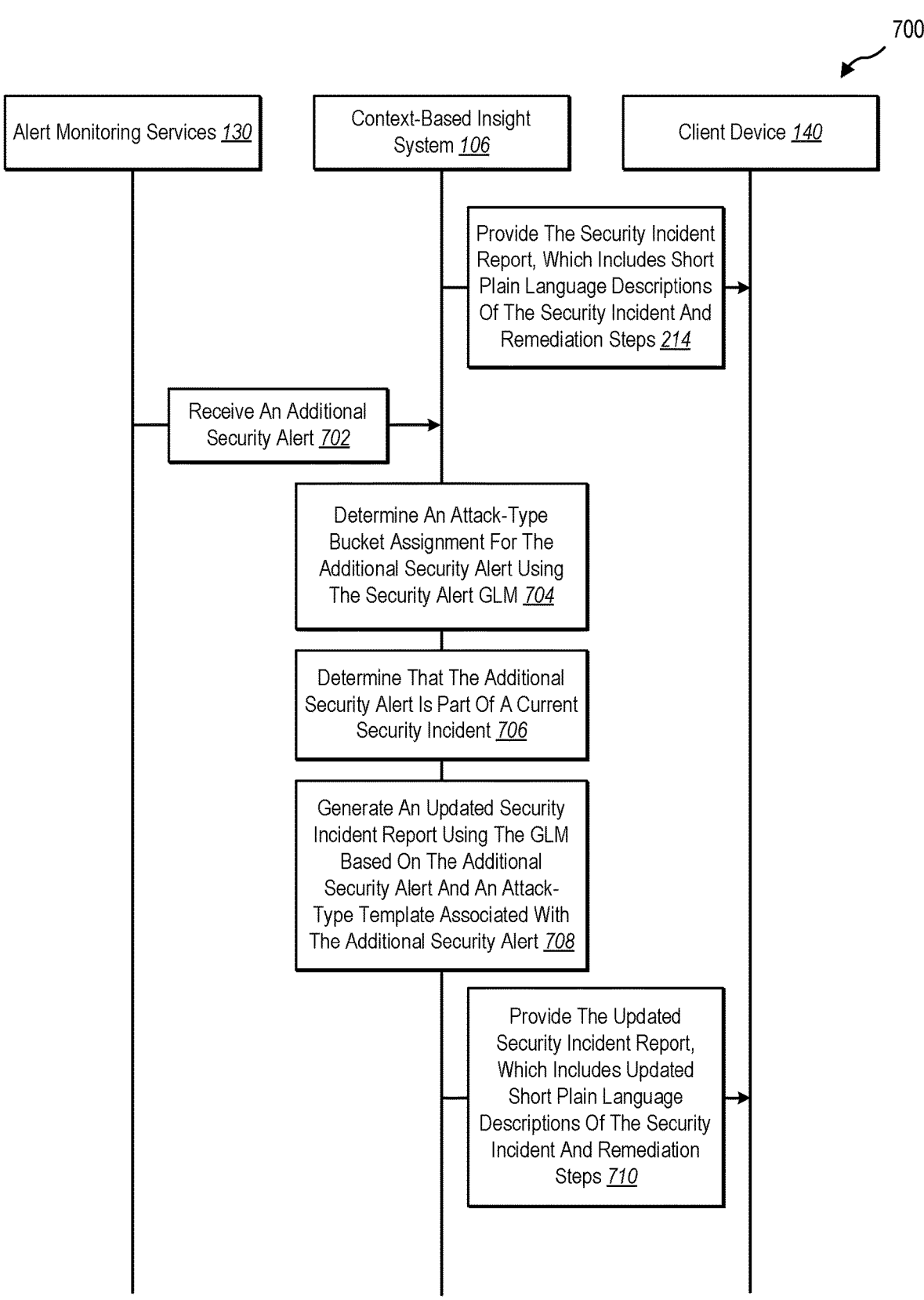
FIG. 7 illustrates an example sequence flow diagram of generating an updated security incident report based on receiving additional security alerts.

In addition to generating security incident reports that include contextually relevant security incident insights and remediation actions for cloud computing systems, the context-based insight system 106 provides a framework for dynamically and automatically updating security incident reports as new security alerts are received. To illustrate, FIG. 7 shows an example sequence flow diagram of generating an updated security incident report based on receiving additional security alerts. As shown, FIG. 7 also includes a series of acts 700 implemented by the context-based insight system 106 in connection with the alert monitoring services 130 and the client device 140, which were introduced above in the context of a cloud computing system.

FIG. 7 follows the context-based insight system 106 generating a security incident report. For context, the series of acts 700 includes the act 214 provided above in FIG. 2 of providing the security incident report to the client device 140, which includes short plain language descriptions of the security incident and remediation steps. As described above, the context-based insight system 106 generates a security incident report that includes a short plain language text narrative of the security incident in the context of the attack types and a short plain language text narrative of remedial steps.

As shown, the series of acts 700 includes the act 702 of the context-based insight system 106 receiving an additional security alert. For example, the alert monitoring services 130 provide one or more security alerts to the context-based insight system 106 after the security incident report is provided to the client device 140. In some implementations, the context-based insight system 106 receives the additional security alert after a threshold amount of time has passed since the last security alert was received that was included in the security incident report and/or since the security incident report was generated. In various instances, the length of the time threshold is based on the security incident type and/or the severity of the security incident to balance between spending processing resources and accurately reporting security incidents.

As shown, the act 704 includes the context-based insight system 106 determining an attack-type bucket assignment for the additional security alert using the security alert GLM. For instance, the security alert GLM processes the additional alerts to determine one or more attack types and assigns the additional alert to the corresponding attack-type bucket, as described above. In some implementations, the security alert generative language model determines to assign the additional alert to a new attack-type bucket.

As shown, the act 706 includes the context-based insight system 106 determining that the additional security alert is part of a current security incident. For example, the context-based insight system 106 correlates the additional security alert to the security incident that is the subject of the previously generated security incident report. Accordingly, in various instances, the context-based insight system 106 adds the additional security alert to the security incident alerts group for the security incident based on the additional security alert correlating with one or more security alerts in the group.

As shown, the act 708 includes the context-based insight system 106 generating an updated security incident report using the security alert GLM based on the additional security alert and the attack-type template associated with the additional security alert. For example, the security alert GLM determines a current or new attack-type template for the additional security alert. In some implementations, the attack-type template is an updated version. The context-based insight system 106 provides the attack-type template associated with the additional security alert to the security alert GLM to generate the updated security incident report.

In various implementations, the context-based insight system 106 also provides the other security alerts in the security incident alerts group and/or access to the other attack-type templates corresponding to those security alerts (e.g., the attack-type templates associated with the security incident). Based on the names, descriptions, and data of the security alerts combined with the information in the attack-type templates (including those added from the additional security alert), the security alert GLM generates an updated security incident report. The context-based insight system 106 ensures that all contextual information, including the newly added alerts, is reflected in the updated description and remediation steps of the updated security incident report.

In some implementations, the security alert GLM generates a new security incident report. In some instances, the security alert GLM revises, rewrites, and/or appends the previously generated security incident report. In any case, the context-based insight system 106 uses the additional security alert and the security alert GLM to provide updated information regarding the security incident. In some instances, this includes providing an updated incident description narrative (e.g., an updated explanation or story of the security incident) and/or an updated remediation action narrative (e.g., new or additional remediation steps).

As additional security alerts are received, the context-based insight system 106 provides a more complete picture of the attack types involved in the security incident and ways to remediate the attack and prevent future incidents related to the security incident. Further, by using the security alert GLM within the context of attack types, the context-based insight system 106 is able to connect security risk patterns and seemingly different attacks into a single security incident where existing systems may report these as separate, unrelated incidents.

As shown, the act 710 includes the context-based insight system 106 providing the updated security incident report to the client device 140, which includes updated short plain language descriptions of the security incident and remediation steps. The context-based insight system 106 may continue to provide updated security incident reports as additional security alerts are received and correlated with the security incident until the security incident is resolved or closed.

Turning now to FIG. 8, this figure illustrates an example flowchart that includes a series of acts 800 for utilizing the context-based insight system in accordance with one or more implementations. In particular, FIG. 8 illustrates an example series of acts for reporting security incidents in a cloud computing system according to some implementations.

While FIG. 8 illustrates acts according to one or more implementations, alternative implementations may omit, add to, reorder, and/or modify any of the acts shown. Furthermore, the acts of FIG. 8 can be performed as part of a method (e.g., a computer-implemented method). Alternatively, a computer-readable medium can include instructions that, when executed by a processing system having a processor, cause a computing device to perform the acts of FIG. 8.

In some implementations, a system (e.g., a processing system comprising a processor) can perform the acts of FIG. 8. For example, the acts include a system for reporting security alerts in a cloud computing system. In some instances, the system includes a processing system and a computer memory including instructions that, when executed by the processing system, cause the system to perform various actions or steps. In various implementations, the system includes a security alert generative language model (GLM).

As shown, the series of acts 800 includes an act 810 of determining attack-type assignments for alerts using a security alert model. For instance, in example implementations, the act 810 involves determining attack-type bucket assignments for security alerts in a set of received security alerts utilizing a security alert generative language model. In various implementations, the act 810 includes receiving the set of received security alerts from a security monitoring agent or service.

In some implementations, the act 810 includes determining to assign a first security alert to a first attack-type bucket utilizing the security alert generative language model based on an alert name and an alert description of the first security alert, wherein the first attack-type bucket belongs to a set of attack-type buckets. In various implementations, the act 810 includes determining to assign the first security alert to a second attack-type bucket utilizing the security alert generative language model based on the alert name and the alert description of the first security alert, wherein the second attack-type bucket belongs to the set of attack-type buckets. In some implementations, the act 810 includes determining to assign a first security alert to a new attack-type bucket utilizing the security alert generative language model based on determining that the first security alert does not correspond with any existing attack-type bucket within a set of attack-type buckets.

As further shown, the series of acts 800 includes an act 820 of generating a security incident by correlating a subset of the received alerts. For instance, in example implementations, the act 820 involves generating a security incident by determining a correlation between a subset of security alerts from the set of received security alerts. In some implementations, the act 820 includes determining that a fallback response threshold is activated. In one or more implementations, the act 810 includes utilizing a correlation engine to determine the correlation between the subset of security alerts. In one or more implementations, the act 810 includes determining that pieces of data between alerts of the subset of security alerts satisfy a correlation threshold. In one or more implementations, the pieces of data include a computing address of the security alerts, security alert names, security alert descriptions, and user identifiers.

As further shown, the series of acts 800 includes an act 830 of identifying attack types for the alerts from the security incident. For instance, in example implementations, the act 830 involves identifying one or more attack-type buckets for the security incident based on the attack-type bucket assignments determined for the subset of security alerts. In some implementations, the subset of security alerts includes security alerts assigned to different attack-type bucket assignments.

As further shown, the series of acts 800 includes an act 840 of generating a security incident report using the security alert model based on the alerts from the security incident and context information of the attack types. For instance, in example implementations, the act 840 involves generating a security incident report using the security alert generative language model based on data from the subset of security alerts and context information of the one or more attack-type buckets, with the security incident report providing a plain language description of the security incident. In some instances, the plain language description includes a short text narrative of the security incident and a text narrative of remediation steps for the security incident.

In one or more implementations, the act 840 includes providing attack-type bucket identifiers for the one or more attack-type buckets to the security alert generative language model. In some instances, the security alert generative language model accesses the context information of the one or more attack-type buckets based on the attack-type bucket identifiers for the one or more attack-type buckets. In some implementations, the act 840 includes providing the security alert generative language model with access to attack-type templates based on the attack-type bucket identifiers. In some implementations, a first attack-type template provides descriptions of a first attack type for a first attack-type bucket to the security alert generative language model. In various implementations, the first attack-type template provides instructions for generating the plain language description framed within the context of a first attack-type.

In some instances, the series of acts 800 includes additional acts. For example, the series of acts 800 includes the acts of receiving an additional security alert after generating the security incident report and/or generating an updated security incident report utilizing the security alert generative language model further based on the additional security alert and the context information of an attack-type bucket assignment for the additional security alert generated by the security alert generative language model. In some implementations, the updated security incident report includes a rewritten plain language description of the security incident and/or the updated security incident report includes an additional remediation step for addressing the security incident.

In one or more implementations, the series of acts 800 includes the acts of receiving an additional security alert, determining attack-type bucket assignment for the additional security alert utilizing the security alert generative language model, adding the additional security alert to the subset of security alerts and the security incident, and generating an updated security incident report utilizing the security alert generative language model further based on the additional security alert and the context information of the attack-type bucket assignment for the additional security alert.

Figure 9:
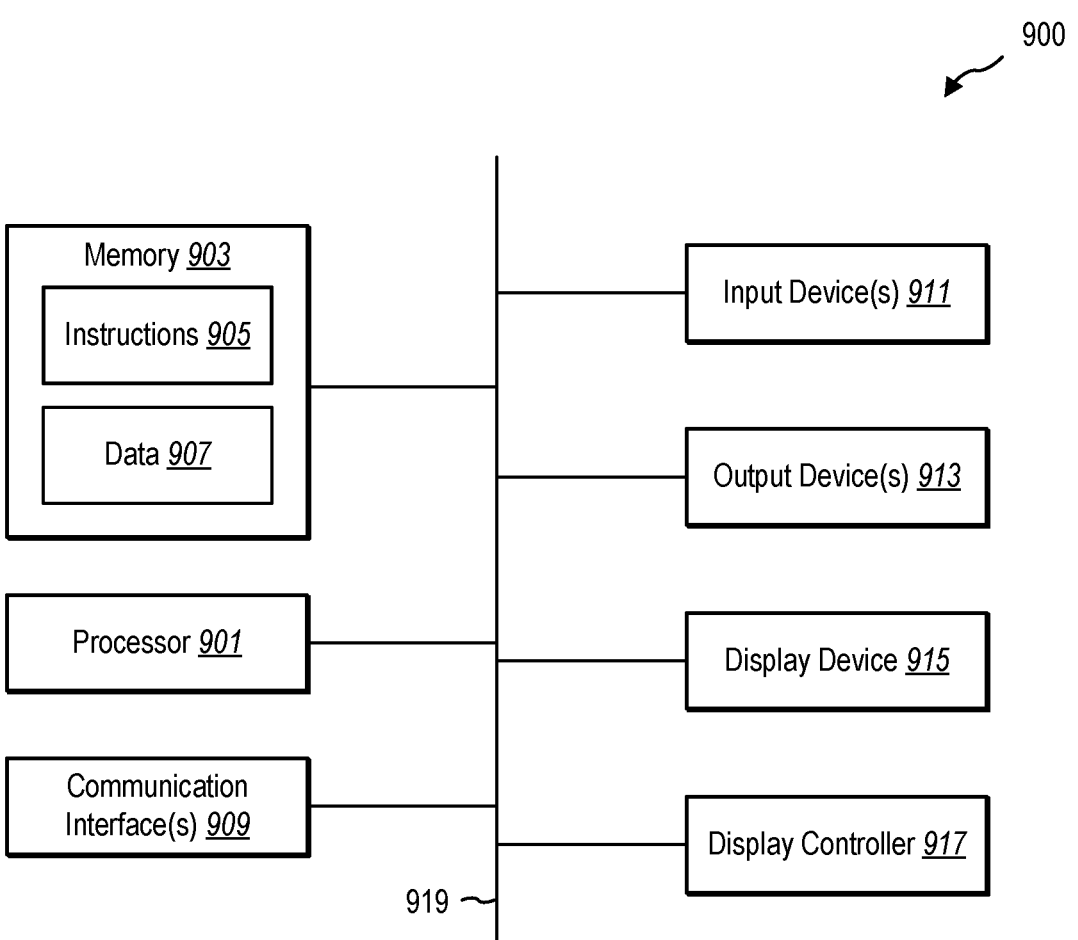
FIG. 9 illustrates example components included within a computer system.

FIG. 9 illustrates certain components that may be included within a computer system 900. The computer system 900 may be used to implement the various computing devices, components, and systems described herein (e.g., by performing computer-implemented instructions). As used herein, a "computing device" refers to electronic components that perform a set of operations based on a set of programmed instructions. Computing devices include groups of electronic components, client devices, server devices, etc.

In various implementations, the computer system 900 represents one or more of the client devices, server devices, or other computing devices described above. For example, the computer system 900 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 900 includes a processing system including a processor 901. The processor 901 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 901 may be referred to as a central processing unit (CPU) and may cause computer-implemented instructions to be performed. Although the processor 901 shown is just a single processor in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 905 and the data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during the execution of the instructions 905 by the processor 901.

A computer system 900 may also include one or more communication interface(s) 909 for communicating with other electronic devices. The one or more communication interface(s) 909 may be based on wired communication technology, wireless communication technology, or both. Some examples of the one or more communication interface(s) 909 include a Universal Serial Bus (USB), an Ethernet adapter, a wireless adapter that operates according to an Institute of Electrical and Electronics Engineers (IEEE)

902.11 wireless communication protocol, a Bluetooth® wireless communication adapter, and an infrared (IR) communication port.

A computer system 900 may also include one or more input device(s) 911 and one or more output device(s) 913. Some examples of the one or more input device(s) 911 include a keyboard, mouse, microphone, remote control device, button, joystick, trackball, touchpad, and light pen. Some examples of the one or more output device(s) 913 include a speaker and a printer. A specific type of output device that is typically included in a computer system 900 is a display device 915. The display device 915 used with implementations disclosed herein may use any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For clarity, the various buses are illustrated in FIG. 9 as a bus system 919.

This disclosure describes a subjective data application system in the framework of a network. In this disclosure, a "network" refers to one or more data links that enable electronic data transport between computer systems, modules, and other electronic devices. A network may include public networks such as the Internet as well as private networks. When information is transferred or provided over a network or another communication connection (either hardwired, wireless, or both), the computer correctly views the connection as a transmission medium. Transmission media can include a network and/or data links that carry required program code in the form of computer-executable instructions or data structures, which can be accessed by a general-purpose or special-purpose computer.

In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the various systems described in this disclosure. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in random-access memory (RAM) within a network interface module (NIC), and then it is eventually transferred to computer system RAM and/or to less volatile computer storage media (devices) at a computer system. Thus, it should be understood that computer-readable storage media (devices) can be included in computer system components that also (or even primarily) use transmission media.

Computer-executable instructions include instructions and data that, when executed by a processor, cause a general-purpose computer, special-purpose computer, or special-purpose processing device to perform a certain function or group of functions. In some implementations, computer-executable and/or computer-implemented instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium, including instructions that, when executed by at least one processor, perform one or more of the methods described herein (including computer-implemented methods). The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method for reporting security incidents in a cloud computing system, the computer-implemented method comprising:

determining, using a security alert generative language model, attack-type bucket assignments for security alerts in a set of received security alerts, wherein the security alert generative language model performs the attack-type bucket assignments for security alerts by correlating intent of the security alerts and performs security incident report generation by determining key fields for the security alerts, mapping alert information with attack type information, and generating a comprehensive account of a security incident as a whole;

generating a security incident by determining a correlation between a subset of security alerts from the set of received security alerts;

determining a correlation between the attack-type bucket assignments and the security incident by identifying, from the attack-type bucket assignments, one or more attack-type buckets that include any of the subset of security alerts associated with the security incident; and generating a security incident report using the security alert generative language model based on data from the subset of security alerts and context information associated with the one or more determined attack-type buckets, the security incident report providing a plain language description of the security incident based on relevant security alerts and relevant attack-type context information.

2. The computer-implemented method of claim 1, further comprising determining to assign a first security alert to a first attack-type bucket utilizing the security alert generative language model based on an alert name and an alert description of the first security alert, wherein the first attack-type bucket belongs to a set of attack-type buckets associated with different types of security incidents.

3. The computer-implemented method of claim 2, further comprising determining to assign the first security alert to a second attack-type bucket utilizing the security alert generative language model based on the alert name and the alert description of the first security alert, wherein the second attack-type bucket belongs to the set of attack-type buckets, and wherein the second attack-type bucket is associated with a different type of security incident from the first attack-type bucket.

4. The computer-implemented method of claim 3, further comprising:

receiving an additional security alert;

determining attack-type bucket assignment for the additional security alert utilizing the security alert generative language model;

adding the additional security alert to the subset of security alerts and the security incident; and generating an updated security incident report utilizing the security alert generative language model further based on the additional security alert and the context information of the attack-type bucket assignment for the additional security alert.

5. The computer-implemented method of claim 4, wherein the updated security incident report includes a rewritten plain language description of the security incident.

6. The computer-implemented method of claim 5, wherein the updated security incident report includes an additional remediation step for addressing the security incident.

7. The computer-implemented method of claim 1, further comprising determining to assign a first security alert to a new attack-type bucket utilizing the security alert generative language model based on determining that the first security alert does not correspond with any existing attack-type bucket within a set of attack-type buckets.

8. The computer-implemented method of claim 1, further comprising providing attack-type bucket identifiers for the one or more determined attack-type buckets to the security alert generative language model, wherein the security alert generative language model accesses the context information of the one or more determined attack-type buckets based on the attack-type bucket identifiers for the one or more determined attack-type buckets.

9. The computer-implemented method of claim 8, further comprising providing the security alert generative language model with access to a plurality of attack-type templates based on the attack-type bucket identifiers.

10. The computer-implemented method of claim 9, wherein a first attack-type template from the plurality of attack-type templates provides descriptions of a first type of security incident associated with a first attack-type bucket to the security alert generative language model.

11. The computer-implemented method of claim 10, wherein the first attack-type template provides instructions for generating the plain language description within a context of the first type of security incident.

12. A system for reporting security incidents in a cloud computing system, the system comprising:

a security alert generative language model, wherein the security alert generative language model performs:

attack-type bucket assignments for security alerts by correlating intent of the security alerts; and security incident report generation by determining key fields for the security alerts, mapping alert information with attack type information, and generating a comprehensive account of a security incident as a whole;

a template repository that include a set of attack-type templates, each attack-type template having a description of a security attack type, key-field selection parameters for security alerts associated with the attack type, and generation instructions that include hierarchy and brevity constraints for combining multiple attack types into a single consolidated narrative;

a processing system; and a computer memory comprising instructions that, when executed by the processing system, cause the system to perform operations of:

determining, using the security alert generative language model, attack-type bucket assignments for security alerts in a set of received security alerts;

generating a security incident by determining a correlation between a subset of security alerts from the set of received security alerts;

determining a correlation between the attack-type bucket assignments and the security incident by identifying, from the attack-type bucket assignments, one or more attack-type buckets that include any of the subset of security alerts associated with the security incident; and generating a security incident report using the security alert generative language model based on data from the subset of security alerts and context information associated with the one or more determined attack-type buckets, the security incident report providing a plain language description of the security incident based on relevant security alerts and relevant attack-type context information.

13. The system of claim 12, wherein the subset of security alerts includes security alerts assigned to different attack-type bucket assignments.

14. The system of claim 12, wherein the plain language description includes a short text narrative of the security incident and a text narrative of remediation steps for the security incident.

15. The system of claim 12, wherein the operations further include utilizing a correlation engine to determine the correlation between the subset of security alerts.

16. The system of claim 12, wherein determining the correlation between the subset of security alerts includes determining that pieces of data between alerts of the subset of security alerts satisfy a correlation threshold.

17. The system of claim 16, wherein the pieces of data include a computing address of the security alerts, security alert names, security alert descriptions, and user identifiers.

18. A computer-implemented method for reporting security incidents in a cloud computing system, the computer-implemented method comprising:

determining, using a security alert generative language model, attack-type bucket assignments for security alerts in a set of received security alerts, wherein the security alert generative language model performs attack-type bucket assignments for security alerts by correlating intent of the security alerts;

generating a security incident by determining a correlation between a subset of security alerts from the set of received security alerts;

determining a correlation between the attack-type bucket assignments and the security incident by identifying, from the attack-type bucket assignments, one or more attack-type buckets that include any of the subset of security alerts associated with the security incident;

generating a security incident report using the security alert generative language model based on data from the subset of security alerts and context information associated with the one or more determined attack-type buckets, the security incident report providing a plain language description of the security incident based on relevant security alerts and relevant attack-type context information, wherein the security alert generative language model performs security incident report generation by determining key fields for the security alerts, mapping alert information with attack type information, and generating a comprehensive account of a security incident as a whole;

receiving an additional security alert after generating the security incident report; and generating an updated security incident report using the security alert generative language model further based on the additional security alert and the context information of an attack-type bucket assignment for the additional security alert generated by the security alert generative language model.

19. The computer-implemented method of claim 18, wherein:

the updated security incident report includes a rewritten plain language description of the security incident; and the updated security incident report includes an additional remediation step for addressing the security incident.

20. The computer-implemented method of claim 18, further comprising receiving the set of received security alerts from one or more security monitoring agents implemented across one or more network devices on the cloud computing system.

* * * * *